Patented Oct. 1, 1929

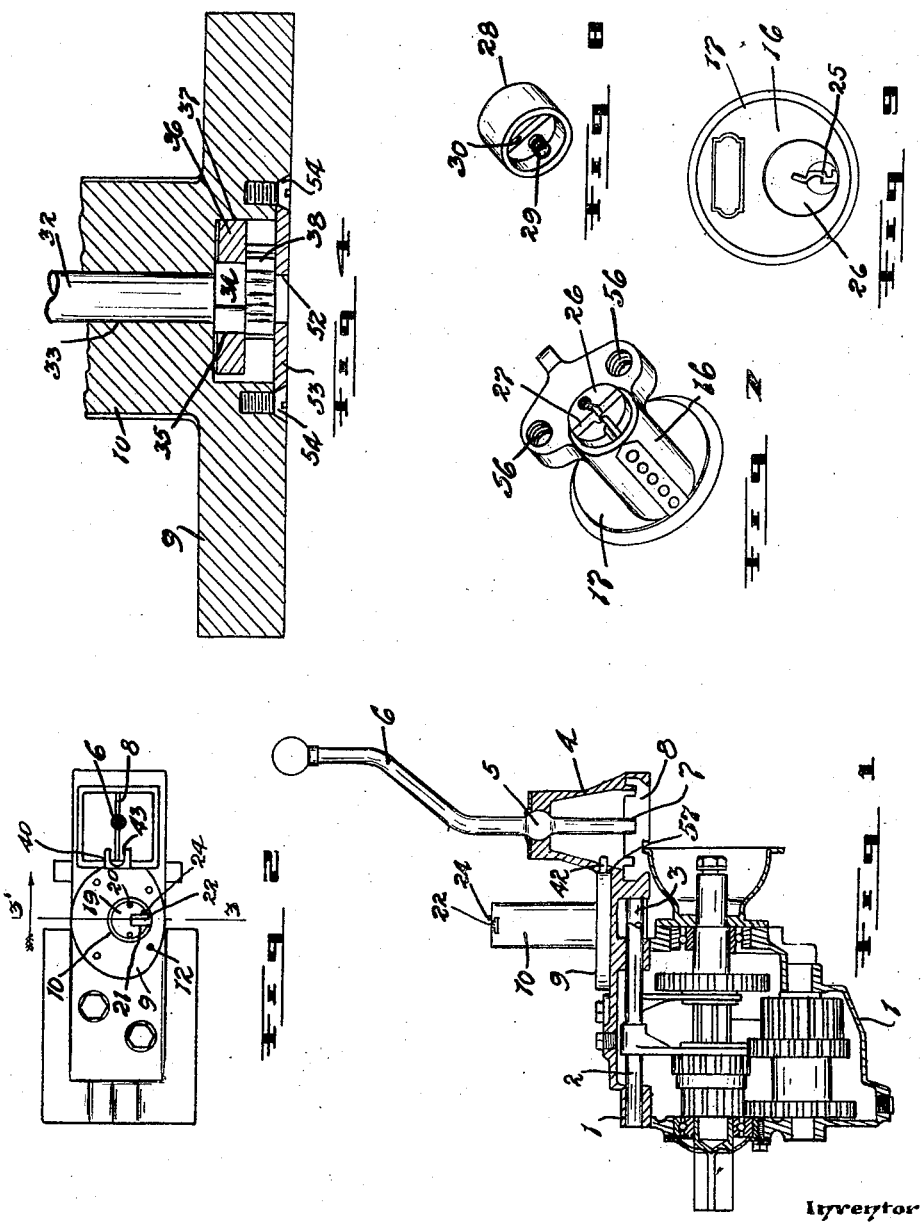

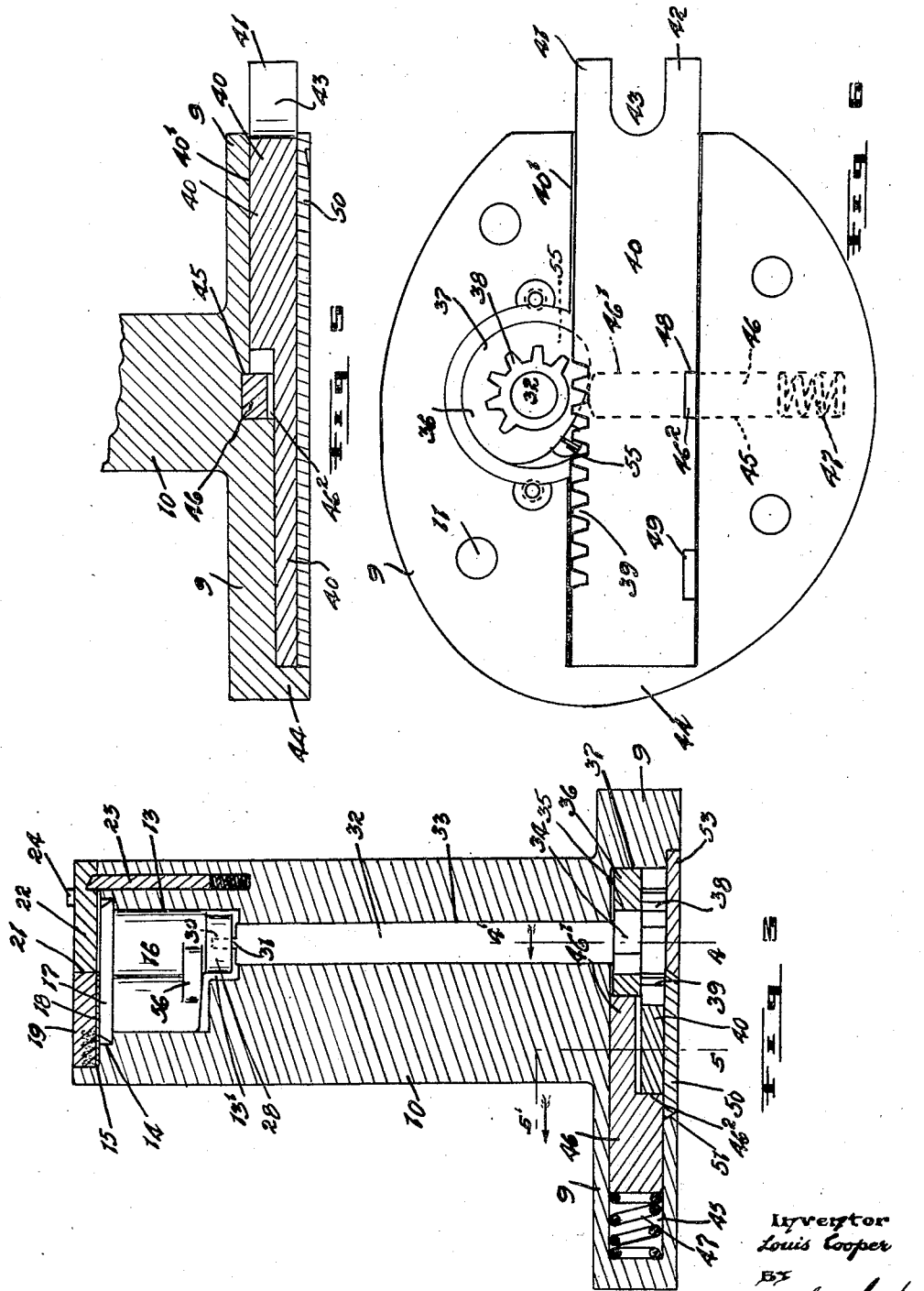

1,730,060

UNITED STATES PATENT OFFICE

LOUIS COOPER, OF WINNIPEG, MANITOBA, CANADA, ASSIGNOR TO SOPHIA COOPER, OF CALGARY, CANADA

AUTOMOBILE LOCK

Application filed March 1, 1928. Serial No. 258,287.

The invention relates to improvements in automobile locks and an object of the invention is to provide a device for positively locking when desired the gear shift lever of an automobile so that the automobile can only be driven by one having the proper key to unlock the device and free the gear shift lever.

A further object of the invention is to provide a device which can be readily mounted on the transmission case and permanently secured thereto and provided with a readily accessible key hole permitting of the easy and quick locking or unlocking of the gear shift lever.

A further object of the invention is to provide a lock which cannot be tampered with, thereby insuring against petty thieving and further to provide a lock which can be utilized on the various existing types of transmission cases to lock the gear shift lever.

A further object of the invention is to construct the lock in a simple, durable and inexpensive manner and such that it can be attached to the gear case as a unit.

With the above more important and other minor objects in view, the invention consists essentially in the arrangement and construction of parts hereinafter more particularly described, reference being had to the accompanying drawings, in which:—

Fig. 1 is a vertical sectional view through the transmission case and showing the various gears, the gear shift lever and associated parts and the transmission case equipped with my lock which appears in side elevation.

Fig. 2 is a plan view of the parts appearing in Figure 1.

Fig. 3 is an enlarged detailed vertical sectional view at 3—3' Figure 2.

Fig. 4 is a vertical sectional view at 4—4' Figure 3 and looking in the direction of the applied arrow.

Fig. 5 is a vertical sectional view at 5—5' Figure 3 and looking in the direction of the applied arrow.

Fig. 6 is an inverted plan view of the under side of the lock with the sliding door and adjoining cover plate removed.

Fig. 7 is a perspective view of the key lock utilized.

Fig. 8 is an inverted perspective view of the extension barrel.

Fig. 9 is a plan view of the key lock.

In the drawings like characters of reference indicate corresponding parts in the several figures.

The transmission case 1 is as customarily employed and contains the usual gears and the shifting shafts 2 and 3 controlling the gears, the shaft 2 controlling intermediate and high and shaft 3 low and reverse. The gear case has the top thereof for the greater part flat and it is provided at the rear end with an upstanding extension 4 in the upper end of which the usual ball 5 of the gear shift lever 6 is rotatably mounted. The lower end of the gear shift lever is adapted as is usual to take a neutral position in the central slot 7 of the lever divider 8 and is shifted from this slot to enter receiving slots in the adjoining ends of the shifting shafts.

It will be observed that when in neutral position, the sides of the slot 7 prevent forward and back movement of the lever 6 and that if the said lever be locked against lateral movement, the automobile cannot be operated as the gears in the transmission case cannot be shifted. A further description of the above parts is not given as they are now in common use.

The lock which I provide is constructed as hereinafter described. It embodies a horizontally disposed base 9 provided with an upwardly extending post or standard 10 herein shown as circular in cross section. The base contains parts later described and it is provided with suitably disposed holes 11 through which rivets 12 are passed, the rivets permanently securing the lock to the top face of the transmission case and in a location centrally in advance of the extension 4. The holes 11 are positioned so that the rivets in no way interfere with any of the operating parts later described.

The upper end of the standard is cored out to provide a cylindrical cavity 13 at the upper end of which two ledges 14 and 15 are provided and in the cavity I place a key lock 16 of the well known Yale or similar type which lock has the flanged upper end 17 thereof resting on the ledge 14. A wear plate 18 overlies the lock and rests on the ledge 15 and above the wear plate is a cover plate 19, the upper face of which is flush with the upper end of the standard.

The parts above described are constructed so that they make a neat fit which is dust proof. The cover plate is fastened to the standard by screws 20 and both the cover plate and the wear plate are provided with an entrance opening 21 which receives a sliding gate 22, the gate sliding outwardly through the side of the standard when in the open position.

The gate, cover plate and wearing plate are all specially constructed in a manner not herein disclosed and means is provided for releasably locking the gate in its closed position, such embodying a catch 23 and a release pin 24 associated with the catch. All the parts just referred to are fully shown and described in my copending application Serial No. 258,288 filed the 1st day of March, 1928, and form the subject matter of a separate invention. It is sufficient for the purpose of this specification, however, to understand that the gate when closed covers the key hole opening 25 of the key lock and that upon one depressing the release pin 24, the gate opens under the action of pressure springs and gives ready access to the key lock.

The lower end of the barrel 26 of the key lock projects beyond the casing and is provided with a cross slot 27 as usual. To the end of the barrel, I attach an extension 28 which is recessed at the upper end to receive the barrel and carries a screw 29 fastening it to the barrel, such causing the extension to rotate when the key is turned in the lock. The extension is received within an extension 13' of the cavity 13 and it is provided with a transverse slot 30 which receives a transverse lug 31 formed at the upper end of a shaft 32 passing rotatably through a suitable hole 33 provided in the standard.

The lower end of the shaft is provided with a square head 34 which enters a square opening 35 formed in a cam 36, the cam being suitably pocketed in a circular recess 37 formed in the base 9. Directly underneath the cam, I permanently attach to the shaft a gear segment 38 which is contained within the cavity 37 and which is designed in the rotation of the shaft to mesh with the teeth 39 of a rack bar 40 slidably mounted in a slot 40' provided in the base 9. It will be observed that one end of the rack bar projects beyond the rear side of the base 9 and is there provided with extending forks 41 and 42 forming a locking slot 43 and that the other end of the rack bar when in the withdrawn position butts or is stopped by the closed end 44 of the slot.

The base is also provided with an opening 45 positioned at right angles to the rack bar and radial to the shaft and in such opening I mount slidably a locking latch 46, the latch being continuously pressed in a direction towards the rack bar by an inserted spring 47. It will be observed that one end 46' of the latch overlies the rack bar and is provided with a rounded end riding the face of the cam 36 and further that the latch is provided with a locking shoulder $46^2$ adapted to engage in one or other of the locking slots 48 and 49 formed in the side of the rack bar. The slot 40' and parts contained therein are enclosed by a sliding door 50 having the edges thereof dove-tailed into receiving guides 51 formed in the base, the under face of the gate being flush with the under face of the base.

The lower end of the shaft 32 is rotatably received within a suitable opening 52 (see Figure 4) provided in a cover plate 53 which is seated in a ledge provided at the lower end of the cavity 37, the plate being fastened by screws 54 to the base. The key lock 16 is fastened permanently in place by similar bolts 55 extending upwardly through the standard and having their upper ends screw threaded into lugs 56 formed at the sides of the key lock. The bolts have their heads countersunk so that they interfere in no way with the rotary movement of the cam 36.

When it is desired to lock the gear shift lever of an automobile equipped with my device, one brings the gear shift lever to the neutral position as shown in Figure 1 with the lower end thereof inserted in the slot 7 of the divider. He then opens the gate 22 by depressing the push pin 24 and next inserts the key in the lock 16. The key is subsequently rotated in a proper direction and as it rotates the cam forces the latch outwardly so that the shoulder $46^2$ is withdrawn from the notch 48. This frees the rack bar and permits the same to end shift rearwardly upon the teeth of the gear segment subsequently engaging the teeth of the rack bar. As the rack bar moves rearwardly, the forks 41 and 42 straddle the gear shift lever which enters the slot 43 and at the time this has occurred, the latch springs into the opening 49 and locks the rack bar against movement. At this time, the shaft has virtually completed one revolution and the teeth of the gear segment are clear of the teeth of the rack bar.

Obviously the device cannot subsequently be unlocked without one being equipped with a key fitting the key lock. To unlock the device, it is simply a matter of inserting the key and turning it in the opposite direction to that just described. Such effects through the cam, the initial release of the shoulder $46^2$ from the notch 49, the subsequent forward shifting of the rack bar and the final relocking of the rack bar by the shoulder $46^2$ entering the notch 48.

I might remark that in order to allow the rack bar to operate when the device is fastened to the transmission case, it is necessary to provide a receiving slot 57 (see Figure 1) in the base of the extension 4 of the gear case as will be readily understood.

What I claim as my invention is:—

1. In an automobile lock, the combination with the gear shift lever located in neutral position, of an encased locking bar endwise shiftable between two limited positions and adapted in one of those positions to engage with and prevent lateral movement of the lower end of the lever, means automatically locking the bar against movement in its limited positions and key actuated means for initially releasing said locking means and subsequently shifting the bar in either direction.

2. In an automobile lock, the combination with the transmission case and the gear shift lever carried by and entering the transmission case and located in neutral position, of a casing permanently fastened to the transmission case, a locking bar slidably carried by the casing and shiftable between two limited positions and adapted in one of said positions to engage the locking lever and prevent lateral movement thereof, means carried by the casing and engageable with the bar and automatically locking the bar against movement in its limited positions and key actuated means mounted in the casing for initially releasing said locking means and subsequently shifting the bar in either direction.

3. In an automobile lock, the combination with the transmission case and the gear shift lever carried by and entering the transmission case and located in neutral position, of a lock comprising a base permanently secured to the top of the gear case in advance of the lever, a standard extending upwardly from the base, a locking bar slidably carried by the base and shiftable between two limited positions and adapted in one of those positions to engage with and prevent lateral movement of the lower end of the lever, a spring pressed latch locking the bar against movement in its limited positions and key actuated means operable from the upper end of the standard for initially releasing the latch and subsequently end shifting the bar in either direction.

4. In an automobile lock, the combination with a transmission case and the gear shift lever carried by and entering the transmission case and located in neutral position, of a lock comprising a base permanently secured to the case in advance of the lever, a standard extending upwardly and integrally formed with the base, a rack bar slidably carried by and mounted within the base and end shiftable between two limited positions and adapted in one of those positions to engage with and prevent lateral movement of the lower end of the lever, an upwardly extending shaft rotatably mounted in the standard, a pinion secured to the lower end of the shaft and engageable with the teeth of the rack bar, a spring pressed latch mounted in the base and engageable with the rack bar and adapted to lock the rack bar against movement in its extreme end shifting positions, a cam carried by the lower end of the shaft and engageable with the latch in the rotation of the cam to release the same and key controlled means for rotating the shaft and located at the upper end of the standard.

5. An automobile lock comprising a base and an upstanding standard carried thereby, a rack bar slidably mounted within the base of the standard and having one end thereof forked, a key lock mounted in the upper end of the standard, operating connections between the key lock and the rack bar adapted upon the application and manipulation of a key to end shift the bar and extend or withdraw the forked end thereof in respect to the base, means for automatically locking the bar in its extended or withdrawn positions and means for automatically releasing said latter means prior to the end shifting of the bar under the influence of the key.

Signed at Winnipeg, this 14th day of February, 1928.

LOUIS COOPER.